US012600323B2

(12) United States Patent
Kondo

(10) Patent No.:     US 12,600,323 B2
(45) Date of Patent:     Apr. 14, 2026

(54) CARRIAGE STRUCTURE

(71) Applicant: Honda Motor Co., Ltd., Tokyo (JP)

(72) Inventor: Shuhei Kondo, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 372 days.

(21) Appl. No.: 18/479,119

(22) Filed: Oct. 2, 2023

(65) Prior Publication Data

US 2024/0166171 A1     May 23, 2024

(30) Foreign Application Priority Data

Nov. 21, 2022     (CN) .......................... 202223081240.8

(51) Int. Cl.
B60S 13/00          (2006.01)
B62D 65/18          (2006.01)
(52) U.S. Cl.
CPC .............. B60S 13/00 (2013.01); B62D 65/18 (2013.01)
(58) Field of Classification Search
CPC ...... B62D 65/18; B62D 65/022; E04H 6/182; E04H 6/18; E04H 6/183; B66F 9/18; B66F 9/063
USPC ........................................................ 269/133
See application file for complete search history.

(56) References Cited

U.S. PATENT DOCUMENTS

| | | | | |
|---|---|---|---|---|
| 4,937,929 A | * | 7/1990 | Nokajima | ............... B61B 13/02 29/430 |
| 6,372,107 B1 | * | 4/2002 | Besinger | ............ B65G 49/0463 204/625 |
| 6,415,721 B1 | * | 7/2002 | Morikiyo | ............... B62D 65/18 104/137 |
| 11,351,657 B1 | * | 6/2022 | Kelsay | ...................... B25B 5/04 |
| 2016/0096567 A1 | * | 4/2016 | Kincses | ................. B62D 65/18 269/56 |
| 2017/0282937 A1 | * | 10/2017 | You | ........................... B61B 3/02 |
| 2017/0369255 A1 | * | 12/2017 | Iglio | ................. B65G 49/0418 |
| 2022/0234665 A1 | * | 7/2022 | Schulze | ..................... B60P 3/06 |
| 2022/0363330 A1 | * | 11/2022 | Schulze | ................. B62D 65/18 |
| 2024/0409378 A1 | * | 12/2024 | Raspone | ................... B66F 9/20 |

FOREIGN PATENT DOCUMENTS

JP          2006123684          5/2006

* cited by examiner

*Primary Examiner* — Kaitlin S Joerger
(74) *Attorney, Agent, or Firm* — JCIPRNET

(57)          ABSTRACT

A carriage structure suitable for transporting a vehicle body includes a vehicle frame and a clamping mechanism. The vehicle frame is provided with a groove portion extending in a vehicle front-rear direction. The groove portion carries a side beam extending in the vehicle front-rear direction in the vehicle body. The clamping mechanism is arranged in an extending direction of the groove portion and clamps the side beam from a vehicle width direction.

6 Claims, 3 Drawing Sheets

CARRIAGE STRUCTURE

CROSS-REFERENCE TO RELATED APPLICATION

This application claims the priority benefit of China application serial no. 202223081240.8, filed on Nov. 21, 2022. The entirety of the above-mentioned patent application is hereby incorporated by reference herein and made a part of this specification.

BACKGROUND

Technical Field

The disclosure relates to a carriage structure.

Description of Related Art

During the manufacturing and assembly processes of a vehicle, the vehicle needs to be moved among multiple stations. However, regarding a currently-available unmanned carriage used for transporting a vehicle body, the carriage cannot completely fix the vehicle body, and as a result, the vehicle body may slide easily, the position of the carriage may be displaced, or even the carriage may fall. In order to solve the above issue, the disclosure aim to improve the fixability of a carriage. Further, the number of times of adjusting the position of the vehicle body or transporting the vehicle body is further lowered, so carbon dioxide emissions may be further reduced.

SUMMARY

The disclosure provides a carriage structure capable of easily fixing and transporting a vehicle body.

The disclosure provides a carriage structure suitable for transporting a vehicle body, and the carriage structure includes a vehicle frame and a clamping mechanism. The vehicle frame is provided with a groove portion extending in a vehicle front-rear direction. The groove portion carries a side beam extending in the vehicle front-rear direction in the vehicle body. The clamping mechanism is arranged in an extending direction of the groove portion and clamps the side beam from a vehicle width direction.

To sum up, the carriage structure provided by the disclosure includes the vehicle frame and the clamping mechanism. The side beam in the vehicle body is limited when being placed on the groove portion of the vehicle frame, and then the clamping mechanism further provides a clamping force to fix the vehicle body. In this way, even if the carriage encounters an emergency stop or an earthquake during transportation, the vehicle body is prevented from sliding in the groove portion and is prevented from being displaced or falling. Therefore, the carriage structure of the disclosure can easily fix and transport the vehicle body.

To make the aforementioned more comprehensible, several embodiments accompanied with drawings are described in detail as follows.

DESCRIPTION OF THE EMBODIMENTS

The disclosure provides a carriage structure suitable for transporting a vehicle body, and the carriage structure includes a vehicle frame and a clamping mechanism. The vehicle frame is provided with a groove portion extending in a vehicle front-rear direction. The groove portion carries a side beam extending in the vehicle front-rear direction in the vehicle body. The clamping mechanism is arranged in an extending direction of the groove portion and clamps the side beam from a vehicle width direction.

In an embodiment of the disclosure, the clamping mechanism includes an actuating portion and a clamping portion. The actuating portion moves in a vehicle up-down direction and abuts against the side beam at a position higher than a bottom surface of the groove portion in the vehicle up-down direction. The clamping portion is linked to the actuating portion. The actuating portion is pressed downward by a weight of the side beam, and the clamping portion clamps the side beam from opposite sides of the side beam in the vehicle width direction.

In an embodiment of the disclosure, the actuating portion is provided with an elongated hole. The clamping portion is provided with a connecting pin passing through the elongated hole and a rotating shaft extending in the extending direction of the groove portion. The clamping portion rotates around the rotating shaft.

In an embodiment of the disclosure, at least two clamping mechanisms are provided in the vehicle front-rear direction. The side beam is clamped by the clamping mechanisms in at least two places.

Figure 1:
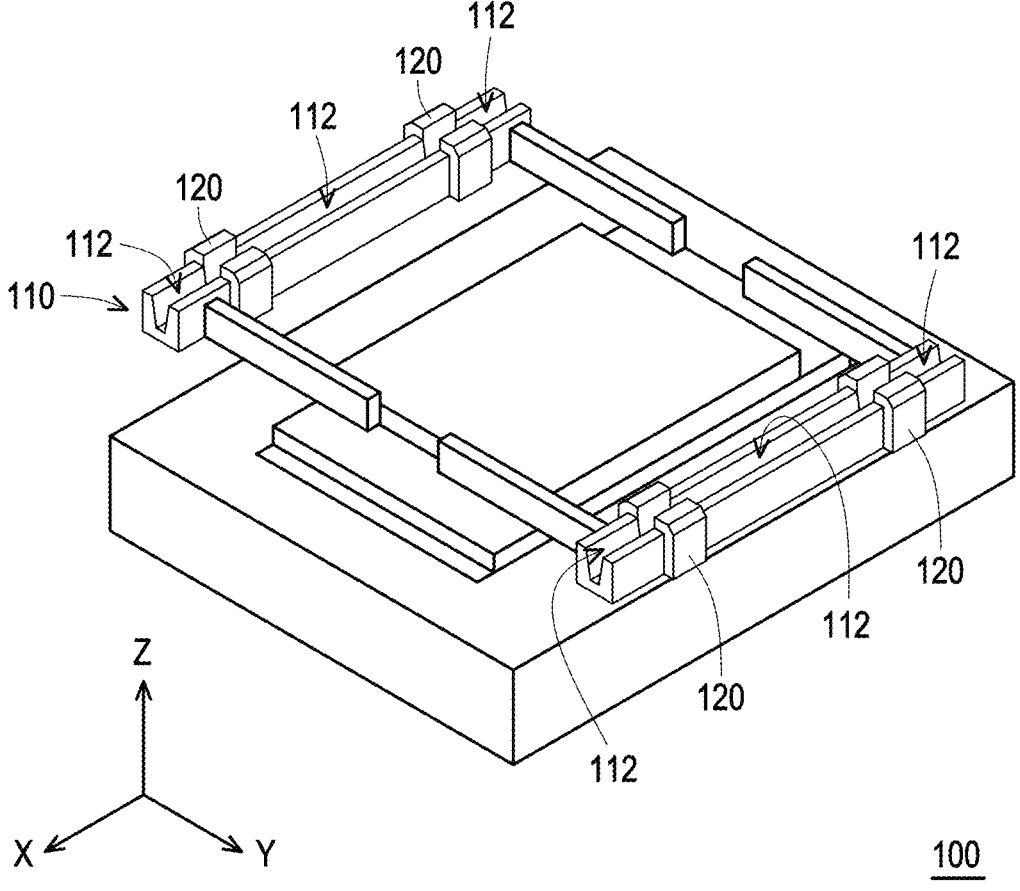
FIG. 1 is a three-dimensional schematic view of a carriage structure according to an embodiment of the disclosure.
Figure 2:
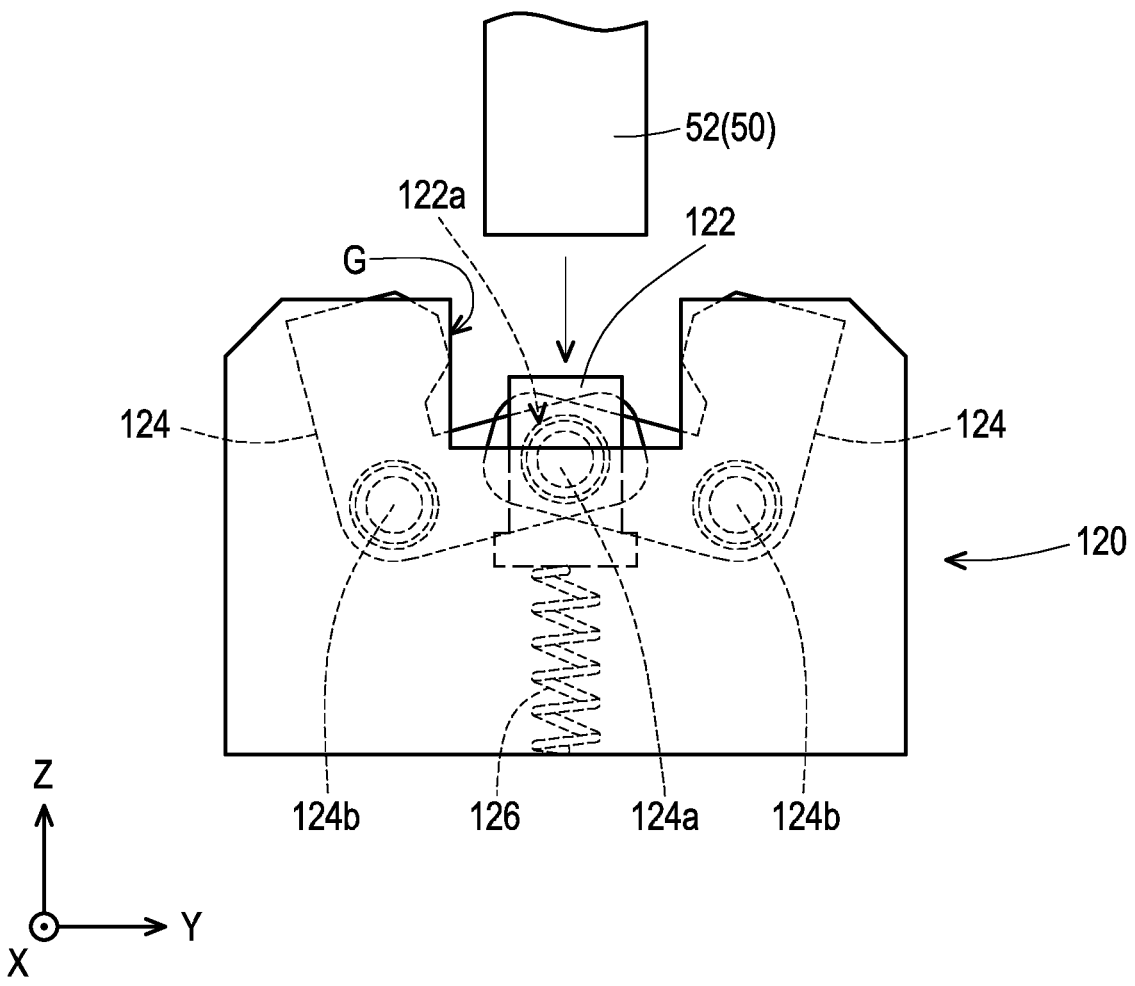
FIG. 2 is a schematic side view of a clamping mechanism in the carriage structure of FIG. 1.
Figure 3:
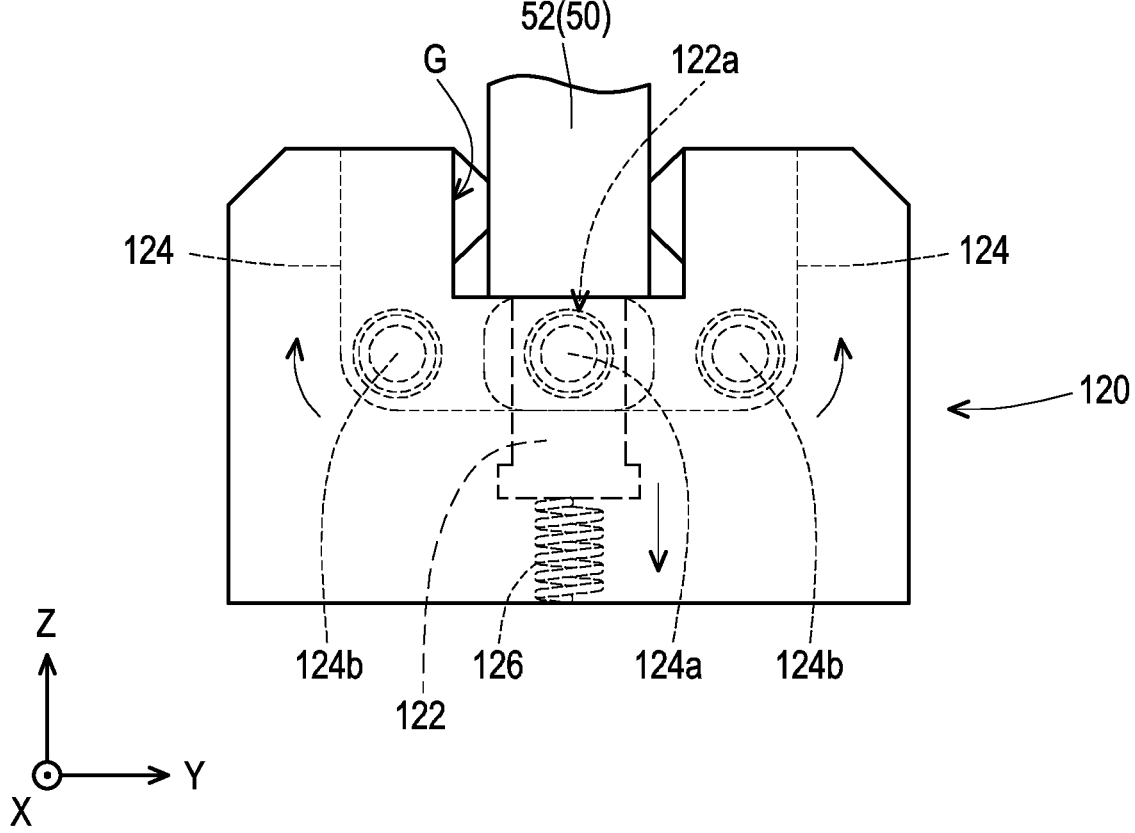
FIG. 3 is a schematic side view of the clamping mechanism in FIG. 2 after it is actuated.

FIG. 1 is a three-dimensional schematic view of a carriage structure according to an embodiment of the disclosure. FIG. 2 is a schematic local side view of a clamping mechanism in the carriage structure of FIG. 1. FIG. 3 is a schematic side view of the clamping mechanism in FIG. 2 after it is actuated. In this embodiment, a carriage structure 100 transports a vehicle body 50 (as shown in FIG. 2) in the form of an unmanned vehicle, but the disclosure is not limited thereto, and the vehicle body or other structures with similar shapes may also be carried by manpower. The specific structure of the carriage structure 100 of this embodiment is to be described below with reference to FIG. 1 and FIG. 3.

With reference to FIG. 1 and FIG. 2, in this embodiment, the carriage structure 100 includes a vehicle frame 110 and a clamping mechanism 120. The vehicle frame 110 is provided with a groove portion 112 extending in a vehicle front-rear direction X. An opening of the groove portion 112 faces upward in a vehicle up-down direction Z. Further, a cross section of the groove portion 112 is formed in a substantially "V" shape when viewed in the vehicle front-rear direction X. The groove portion 112 is adapted to carry a side beam 52 (as shown in FIG. 2) extending in the vehicle front-rear direction X in the vehicle body 50 in the vehicle up-down direction Z. The clamping mechanism 120 is provided in an extending direction of the groove portion 112. To be specific, the clamping mechanism 120 is arranged on the way of the extension of the groove portion 112, that is, the clamping mechanism 120 is arranged in the form of dividing the groove portion 112 into two sections, but the disclosure is not limited thereto. The clamping mechanism 120 clamps the side beam 52 from a vehicle width direction Y. Herein, the extending direction of the groove portion 112 and a clamping direction of the clamping mechanism 120 are not limited to the vehicle front-rear direction X and the vehicle width direction Y and can be adjusted according to actual needs, as long as the vehicle body 50 can be firmly fixed in the extending direction of the groove portion 112 and the clamping direction of the clamping mechanism 120.

It thus can be seen that the carriage structure 100 of this embodiment includes the vehicle frame 110 and the clamping mechanism 120. Therefore, the side beam 52 in the vehicle body 50 may be limited when being placed on the groove portion 112 of the vehicle frame 110, and then the clamping mechanism 120 further provides a clamping force to fix the side beam 52. In this way, even if a carriage encounters an emergency stop or an earthquake during transportation, the vehicle body 50 may be prevented from sliding in the groove portion 112 and may be prevented from being displaced or falling. Therefore, the carriage structure 100 of this embodiment may easily fix and transport the vehicle body 50.

In this embodiment, preferably, at least two clamping mechanisms 120 are provided in the vehicle front-rear direction X, and the side beam 52 is clamped by the clamping mechanisms 120 in at least two places. Two or more clamping mechanisms 120 may more firmly clamp the side beam 52 to prevent the side beam 52 from sliding in the groove portion 112. However, the arrangement of the clamping mechanism 120 may also be provided with only one, and the disclosure is not limited thereto.

The structure and the actuation of the clamping mechanism 120 are further described as follows.

With reference to FIG. 2 and FIG. 3, in this embodiment, the clamping mechanism 120 is formed with a concave portion G having a same depth as the groove portion 112 of the vehicle frame 110. As such, when the side beam 52 is placed on the vehicle frame 110, a bottom surface of the side beam 52 may be flat against a bottom surface of the groove portion 112 and a bottom surface of the concave portion G. Further, the clamping mechanism 120 includes an actuating portion 122 and a clamping portion 124. The actuating portion 122 is movably arranged in the concave portion G in the vehicle up-down direction Z and abuts against the side beam 52 at a position higher than the bottom surface of the groove portion 112 (equivalent to a position higher than the bottom surface of the concave portion G) in the vehicle up-down direction Z. Regarding the changes from FIG. 2 to FIG. 3, the clamping portion 124 is linked to the actuating portion 122. The actuating portion 122 is pressed downward by a weight of the side beam 52, and the clamping portion 124 clamps the side beam 52 from opposite sides of the side beam 52 in the vehicle width direction Y.

To be specific, in this embodiment, the actuating portion 122 is provided with an elongated hole 122a, and the clamping portion 124 is provided with a connecting pin 124a passing through the elongated hole 122a. Therefore, when the actuating portion 122 receives a downward force, this downward force may be transmitted to the clamping portion 124 through the connecting pin 124a. The clamping portion 124 is further provided with a rotating shaft 124b extending in the extending direction of the groove portion 112, and the rotating shaft 124b is away from the actuating portion 122 in the vehicle width direction Y. In this way, the force transmitted by the connecting pin 124a may be converted into a torque to make the clamping portion 124 rotate around the rotating shaft 124b. Regarding the changes from FIG. 2 to FIG. 3, after the actuating portion 122 is pressed down by the weight of the side beam 52, the clamping portion 124 rotates around the rotating shaft 124b and approaches the side beam 52 for clamping. In this way, the clamping mechanism 120 of this embodiment may clamp the side beam 52 by the weight of the side beam 52 itself. Further, the clamping may be easily released after the side beam 52 is lifted. Herein, the clamping portion 124 is, for example, concave, so as to be adapted to rotate after one end thereof is applied by a force and to clamp the side beam 52 by the other end, but the disclosure is not limited thereto.

In addition, in this embodiment, the clamping mechanism 120 further includes a spring 126 arranged below the actuating portion 122 in the vehicle up-down direction Z and connected to the actuating portion 122. It thus can be seen that when the actuating portion 122 is pressed down by the weight of the side beam 52, the spring 126 is compressed to accumulate elastic potential energy. When the side beam 52 is moved out, the spring 126 pushes the actuating portion 122 back to its original position in the vehicle up-down direction Z by releasing the elastic potential energy. Further, the clamping portion 124 rotates around the rotating shaft 124b and is away from the opposite sides of the side beam 52 in the vehicle width direction Y, as shown in the changes from FIG. 3 to FIG. 2.

In view of the foregoing, the carriage structure provided by the disclosure includes the vehicle frame and the clamping mechanism. Therefore, the side beam in the vehicle body may be limited when being placed on the groove portion of the vehicle frame, and then the clamping mechanism further provides a clamping force to fix the vehicle body. In this way, even if the carriage encounters an emergency stop or an earthquake during transportation, the vehicle body may be prevented from sliding in the groove portion and may be prevented from being displaced or falling. Preferably, at least two clamping mechanisms are provided in the vehicle front-rear direction, so as to more firmly clamp the side beam. Therefore, the carriage structure of the disclosure may easily fix and transport the vehicle body.

Finally, it is worth noting that the foregoing embodiments are merely described to illustrate the technical solutions of the disclosure and should not be construed as limitations of the disclosure. Even though the foregoing embodiments are referenced to provide detailed description of the disclosure, a person having ordinary skill in the art should understand that various modifications and variations can be made to the technical solutions in the disclosed embodiments, or equivalent replacements may be made for part or all of the technical features. Nevertheless, it is intended that the modifications, variations, and replacements shall not make the nature of the technical solutions to depart from the scope of the technical solutions of the embodiments of the disclosure.

What is claimed is:

1. A carriage structure suitable for transporting a vehicle body, the carriage structure comprising:

a vehicle frame provided with a groove portion extending in a vehicle front-rear direction, wherein the groove portion carries a side beam extending in the vehicle front-rear direction in the vehicle body; and a clamping mechanism arranged in an extending direction of the groove portion and clamping the side beam from a vehicle width direction, wherein the clamping mechanism is arranged on a way of the extension of the groove portion.

2. The carriage structure according to claim 1, wherein the clamping mechanism comprises:

an actuating portion moving in a vehicle up-down direction and abutting against the side beam at a position higher than a bottom surface of the groove portion in the vehicle up-down direction; and a clamping portion linked to the actuating portion, wherein the actuating portion is pressed downward by a weight of the side beam, and the clamping portion clamps the side beam from opposite sides of the side beam in the vehicle width direction.

3. The carriage structure according to claim 2, wherein the actuating portion is provided with an elongated hole, the clamping portion is provided with a connecting pin passing through the elongated hole and a rotating shaft extending in the extending direction of the groove portion, and the clamping portion rotates around the rotating shaft.

4. The carriage structure according to claim 1, wherein at least two clamping mechanisms are provided in the vehicle front-rear direction, and the side beam is clamped by the clamping mechanisms in at least two places.

5. The carriage structure according to claim 2, wherein at least two clamping mechanisms are provided in the vehicle front-rear direction, and the side beam is clamped by the clamping mechanisms in at least two places.

6. The carriage structure according to claim 3, wherein at least two clamping mechanisms are provided in the vehicle front-rear direction, and the side beam is clamped by the clamping mechanisms in at least two places.

* * * * *